US007962325B2

(12) United States Patent
Tagata et al.

(10) Patent No.: US 7,962,325 B2
(45) Date of Patent: Jun. 14, 2011

(54) SERVER DEVICE, METHOD USED IN SERVER DEVICE, AND COMPUTER PROGRAM

(75) Inventors: Naoki Tagata, Kagoshima (JP); Yuki Dogo, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 902 days.

(21) Appl. No.: 11/923,319

(22) Filed: Oct. 24, 2007

(65) Prior Publication Data

US 2008/0097746 A1    Apr. 24, 2008

(30) Foreign Application Priority Data

Oct. 24, 2006 (JP) ................................. 2006-288628

(51) Int. Cl.
    *G06F 17/20* (2006.01)
(52) U.S. Cl. ............. 704/8; 704/9; 704/1; 704/2; 704/3; 704/257
(58) Field of Classification Search .................. 704/8, 9, 704/1, 2, 3, 257
    See application file for complete search history.

(56) References Cited

U.S. PATENT DOCUMENTS

| 7,082,392 | B1 * | 7/2006 | Butler et al. .................. 704/233 |
| 7,373,347 | B2 | 5/2008 | Takahashi et al. | |
| 7,630,974 | B2 * | 12/2009 | Remahl et al. ........................ 1/1 |
| 7,711,548 | B2 * | 5/2010 | Carroll et al. ..................... 704/8 |
| 2002/0083453 | A1 * | 6/2002 | Menez ............................. 725/47 |
| 2002/0174196 | A1 * | 11/2002 | Donohoe et al. .............. 709/219 |
| 2004/0210841 | A1 | 10/2004 | Takahashi et al. | |
| 2008/0189423 | A1 * | 8/2008 | Takahashi et al. ............ 709/227 |

FOREIGN PATENT DOCUMENTS

| JP | 2002-251261 A | 9/2002 |
| JP | 2004-103007 A | 4/2004 |
| JP | 2004-213462 A | 7/2004 |
| JP | 2004-227199 A | 8/2004 |

OTHER PUBLICATIONS

Open Design, Apr. 2002.

* cited by examiner

*Primary Examiner* — Qi Han
(74) *Attorney, Agent, or Firm* — Sughrue Mion, PLLC

(57) ABSTRACT

A server device which can provide a client device with information in a plurality of languages includes a supportable language recognizing unit recognizing a plurality of supportable languages using language identification information, a requested language recognizing unit recognizing a requested language desired by the client device using the language identification information, an attribute information acquiring unit acquiring attribute information associated with the language identification information, and a language selecting unit selecting one supportable language from the plurality of supportable languages as a support language in which information is provided to the client device, using the attribute information when the language identification information of the requested language does not match with that of any supportable language.

12 Claims, 6 Drawing Sheets

FIG. 3

SUPPORT LANGUAGE TABLE

| en-AU |
|---|
| zh-AU |
| ru-AU |
| de-DE |
| en-GB |

TABLE OF PRIORITY COUNTRY CODES AND LANGUAGE CODES

| LANGUAGE CODE | ja | en | zh | ru |
|---|---|---|---|---|
| PRIORITY COUNTRY CODE | 1: JP | 1: US | 1: CN | 1: RU |
| | 2: US | 2: GB | 2: US | 2: US |
| | 3: CN | 3: AU | 3: AU | 3: AU |

TABLE OF COUNTRY CODES AND DEFAULT LANGUAGES

| COUNTRY CODE | US | CN | RU | DE | GB | AU |
|---|---|---|---|---|---|---|
| DEFAULT LANGUAGE | en-US | zh-CN | ru-RU | de-DE | en-GB | en-AU |

TABLE OF COUNTRY CODES AND GROUP CODES

| COUNTRY CODE | US | JP | AU | CN | RU | GB |
|---|---|---|---|---|---|---|
| GROUP CODES | 1: D | 1: A | 1: C | 1: A | 1: A | 1: C |
| | 2: E | 2: F | 2: F | 2: F | | |
| | 3: C | | | | | |

TABLE OF PRIORITY COUNTRY CODES AND GROUP CODES

| GROUP CODE | A | B | C | D | E | F |
|---|---|---|---|---|---|---|
| LANGUAGE DISCRIMINATION INFORMATION | 1: en-US | 1: fr-FR | 1: en-GB | 1: en-CA | 1: es-AR | 1: zh-CN |
| | 2: en-GB | 2: it-IT | 2: de-DE | 2: en-US | 2: pt-BR | 2: ja-JP |
| | 3: en-AU | 3: es-ES | 3: nl-NL | | | |

A: FIRST FOREIGN LANGUAGE IS ENGLISH  
B: LATIN FALISCI LANGUAGE GROUP  
C: WESTERN GERMAN LANGUAGE GROUP  
D: NORTH AMERICA  
E: SOUTH AMERICA  
F: ASIA

SERVER DEVICE, METHOD USED IN SERVER DEVICE, AND COMPUTER PROGRAM

BACKGROUND

1. Technical Field

The present invention relates to a server device and a method and a program associated with the server device, and more particularly, to a server device which can provide information in a plurality of languages and a method and a program associated with the server device.

2. Related Art

As for a server device, JP-A-2004-227199 discloses a server device which can provide information (contents) in a plurality of languages. According to this technique, a web server device which provides files in HTML or XHTML format to client devices having a web browser based on HTTP protocol has a plurality of files which are preliminarily prepared and described in a plurality of languages and selects one file from the plurality of files using language identification information described in an accept-language field included in a HTTP request.

In the above-mentioned technique, in the case in which a requested language and a support language are not the same as each other, the following processing is performed. That is, (1) the web server sends an error message and (2) the web server selects one language which is preliminarily predetermined. Accordingly, there is a probability that a language far from a language desired by a user of the client device is selected.

SUMMARY

An advantage of some aspects of the invention is that it provides a server device which can provide information in a plurality of languages, in which the server device can select a language which is desirable for a user of a client device from supportable languages with high probability.

A first aspect of the invention is to provide a server device which can provide a client device information in a plurality of languages. The server device includes a supportable language recognizing unit, a requested language recognizing unit, an attribute information acquiring unit, and a language selecting unit. The supportable language recognizing unit recognizes a plurality of supportable languages by using language identification information. The requested language recognizing unit recognizes a requested language desired by the client device by using the language identification information. The attribute information acquiring unit acquires attribute information associated with the language identification information. The language selecting unit selects a support language in which information is provided to a user of the client device from the plurality of supportable languages using the attribute information when the language identification information of the requested language does not match with the language identification information of any supportable languages.

With the above-mentioned structure, in the case in which the language identification information of the requested language does not match with the language identification information of any supportable languages, the support language in which information is provided to the client device is selected from the supportable languages using the attribute information. Accordingly, it is possible to provide information in a desirable language to a user of the client device even when the server device does not support the requested language.

In the server device, it is preferable that the language identification information includes at least a first identifier, the attribute information includes priority information used in order to determine priorities of the plurality of supportable languages of which the first identifiers are the same as each other, and the language selecting unit selects the most desirable language for a user of the client device according to the priorities from the supportable languages of which the first identifiers match with the first identifier of the requested language when there is no supportable language of which the language identification information does not match with the language identification information of the requested language but there is one or more supportable language of which the first identifier matches with the first identifier of the requested language.

In the server device, it is preferable that the first identifier is a language code. With this manner, it is possible to provide a user of the client device with information in the most desirable language for a user of the client device, among the languages of which language codes match with the language code of the requested language.

In the server device, it is preferable that the language identification information includes a language code and a country code. Further, it is preferable that the priority is determined according to the country codes. With this manner, it is possible to provide the client device with information in the most desirable language for a user of the client device according to the priority order determined on the basis of the country codes.

In the server device, it is preferable that the language identification information includes a second identifier, the attribute information includes default information which specifies a default language for each second identifier, and the language selecting unit selects the support language from the supportable languages of which the second identifiers match with the second identifier of the requested language on the basis of the default information when there is no language identification information matching with the language identification information of the requested language but there is the second identifier matching with the second identifier of the requested language. With this manner, it is possible to select the most desirable support language for a user of the client device according to the default information.

In the server device, it is preferable that the second identifier is a country code. With this manner, it is possible to select the most desirable language for a user of the client device from the supportable languages of which the country codes match with the country code of the requested language.

In the server device, it is preferable that the language identification information is preliminarily classified into a plurality of groups, the attribute information includes first group information used to specify a group to which the requested language belongs, and the language selecting unit selects the support language from the supportable languages depending on the group to which the requested language belongs. With this manner, it is possible to provide a user of the client device with information in the most desirable language for the client device while taking into consideration of the group to which the requested language belongs.

In the server, it is preferable that the attribute information includes second group information used to specify the supportable languages in the group to which the requested language belongs, and the language selecting unit selects one language from the supportable languages in the group to which the requested language belongs as the support language. With this manner, it is possible to select the most desirable language for a user of the client device because it selects the supportable language in the group to which the requested language belongs as the support language.

In the server, it is preferable that the language identification information includes at least a second identifier and the first group information is associated with the language identification information for each second identifier. In this case, the second identifier may be a country code. With this manner, it is possible to select the most desirable language for a user of the client device while taking into consideration of features of a country corresponding to the country code.

In the server device, it is preferable that the requested language recognizing unit recognizes the requested language by acquiring the language identification information included in an information provision request from the client device. With this manner, it is possible to easily recognize the requested language.

In the server device, it is preferable that the attribute information which is preliminarily determined is stored in an attribute information storage unit while having relation with the language identification information, and the attribute information acquiring unit acquires the attribute information from the attribute information storage unit. With this manner, it is possible for the server device to easily acquire the attribute information.

In addition, the invention can be realized in a variety of forms. For example, the invention can be realized into a client device with the same method implemented in the server device which can provide information in a plurality of languages. The invention also can be realized into a computer program for implementing the device and method, a recording medium storing the computer program, or data signals which include the computer program and are carried by carrier waves.

BRIEF DESCRIPTION OF THE DRAWINGS

The invention will be described with reference to the accompanying drawings, wherein like numbers reference like elements.

FIG. 3 is a view schematically illustrating language attribute information stored in a language attribute information storage portion.

DESCRIPTION OF EXEMPLARY EMBODIMENTS

Hereinafter, embodiments of the invention will be described with reference to the accompanying drawings.

A: Embodiment

Structure of a Network System

Figure 1:
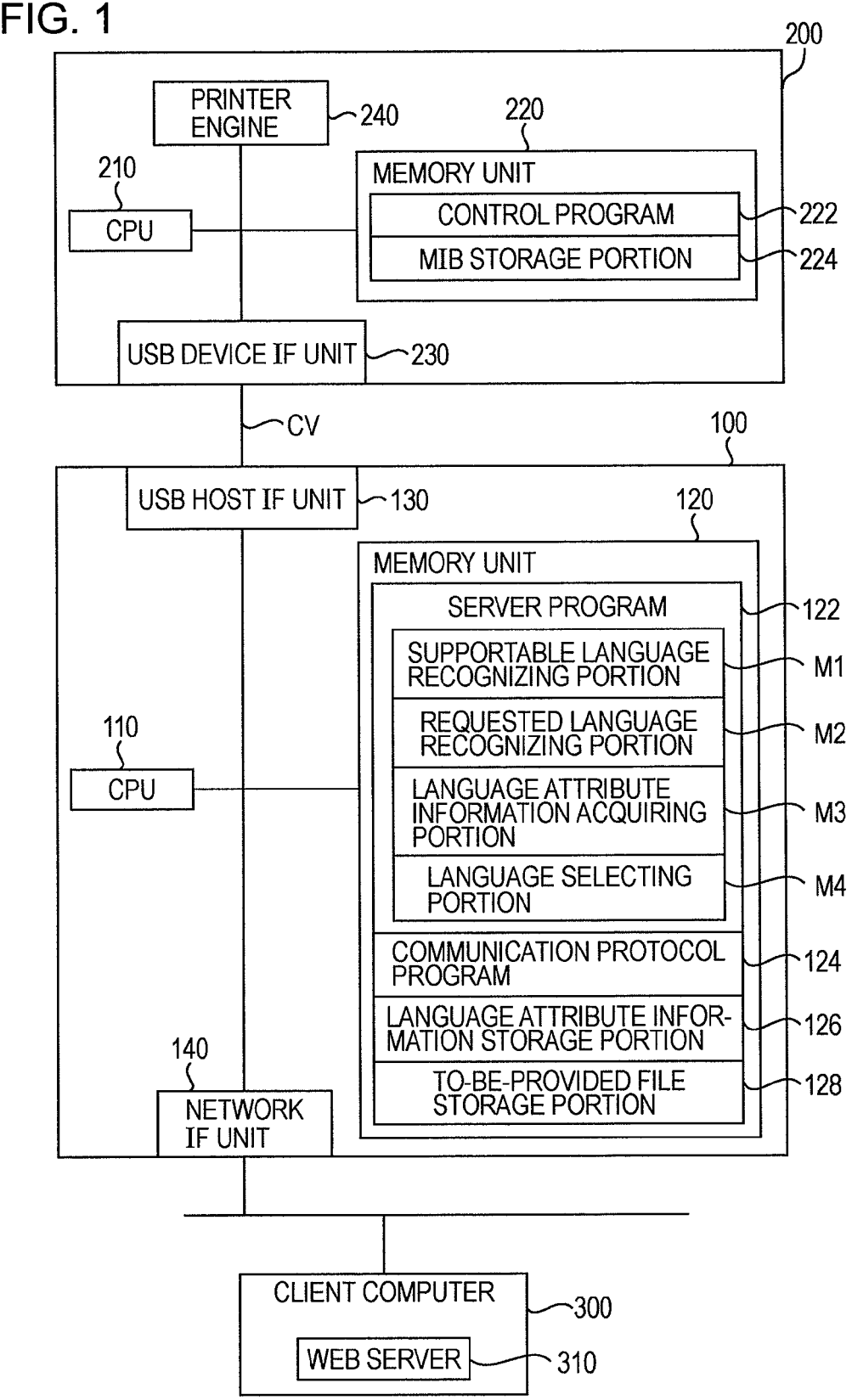
FIG. 1 is a schematic diagram illustrating a structure of a network system.
Figure 2:
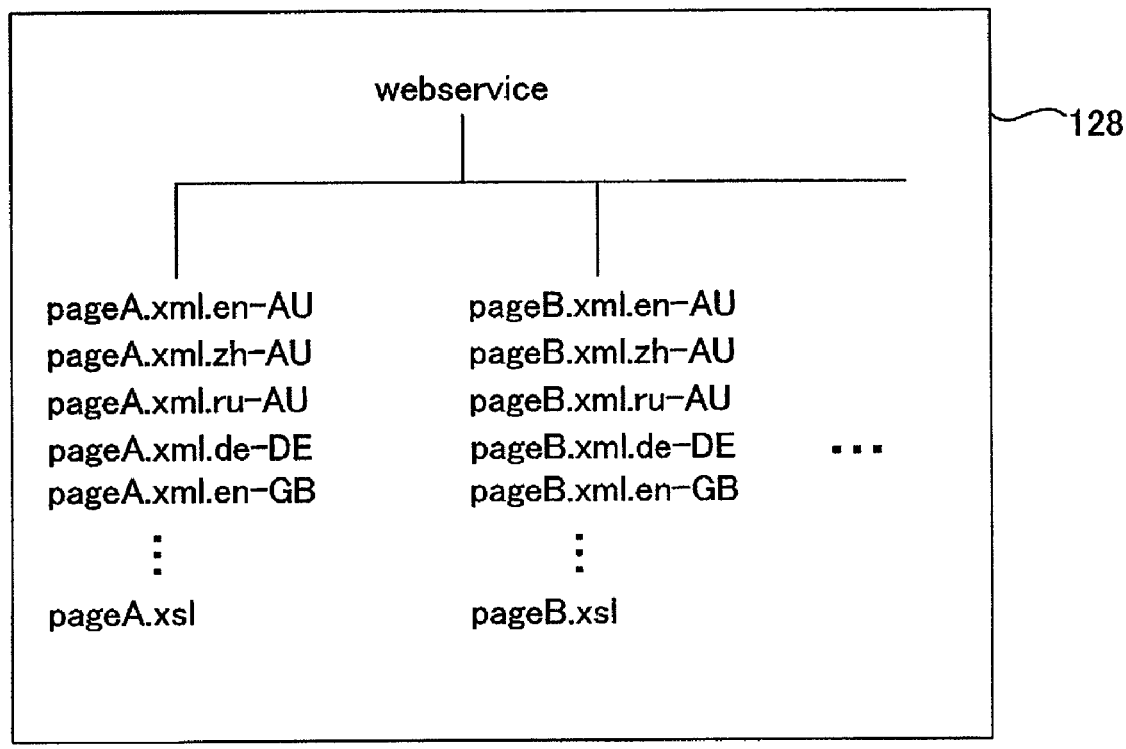
FIG. 2 is a view illustrating file groups stored in a to-be-provided file storage portion.

With reference to FIGS. 1 to 3, a structure of a network system according to embodiments will be described. FIG. 1 schematically shows the structure of the network system, FIG. 2 schematically shows file groups stored in a to-be-provided file storage portion, and FIG. 3 schematically shows language attribute information stored in a language attribute information storage portion. As shown in FIG. 1, the network system includes a print server device 100, a printer 200, and a computer 300 serving as a client device 300 (hereinafter, referred to as "client"). The client 300 and the print server device 100 are connected to each other via a network NW such as a local area network (LAN). The print server device 100 and the printer 200 are connected to each other via a universal serial bus (USB) cable CV.

As shown in FIG. 1, the print server device 100 includes a central processing unit (CPU) 110, a memory unit 120, a USB host interface (IF) unit 130, and a network interface (IF) unit 140.

The USB host IF unit 130 is an interface device enabling communication with local devices such as the printer 200 via the USB cable CV. Data communication based on the USB standard is performed between the local devices connected via the USB cable CV.

The network IF unit 140 is an interface device enabling communication with the client 300 via the network NW and is connected to the network NW via a cable which meets specifications of ETHERNET.

The CPU 110 executes a variety of programs stored in the memory unit 120 and performs a function of the printer server.

The memory unit 120 stores a variety of programs and data. FIG. 1 selectively shows elements of the memory unit 120 which are needed to process the embodiment, and the present application specification will explain only the shown elements of the memory unit 120. The memory unit 120 stores a server program 122 and a communication protocol program 124. The memory unit 120 includes a language attribute information storage portion 126 and a to-be-provided file storage portion 128.

The server program 122 is a program which performs main functions of the print server device when it is executed by the CPU 110, such as a function of providing printing service which makes the printer 200 perform printing operation in response to a request from the client 300, a function of providing the client 300 with information of the printer 200 in response to a request from the client 300, and a function of providing printer management service enabling setting of the printer 200. The server program 122 includes a plurality of functional portions including a supportable language recognizing portion M1, a requested language recognizing portion M2, a language attribute information acquiring portion M3, and a language selecting portion M4. The supportable language recognizing portion M1 recognizes supportable languages in which information can be provided using language identification information which will be described later. The requested language recognizing unit M2 recognizes a requested language desired by the client using the language identification information. The language attribute information acquiring portion M3 acquires language attribute information which will be described later. The language selecting portion M4 performs support language selection processing which will be described later.

The communication protocol program 124 performs functions of communication protocols in the layer of the server program 122. In greater detail, the communication protocol program 124 employs a protocol (driver) for enabling communication with the printer 200 via the USB host IF unit 130. The communication protocol program 124 employs Hyper Text Transfer Protocol (HTTP) and TCP/IP which is an under-layer protocol of the HTTP.

The to-be-provided file storage portion 128 contains to-be-provided information to be provided to the client 300 by the server program 122. For example, the to-be-provided file storage portion 128 contains a file describing a web page which provides a graphical user interface (GUI) to a user for the printer management service.

Language attribute information is stored in the language attribute information storage portion 126 while having relation with the language identification information. The language attribute information and the language identification information will be described later.

As shown in FIG. 1, the printer 200 includes a CPU 210, a memory unit 220, a USB device interface (IF) unit 230, and a printer engine 240.

The USB device IF unit 230 is an interface device enabling communication with the print server device 100 via the USB cable CV.

The printer engine 240 is a mechanical portion for substantially performing printing and is constituted by a hardware group for performing printing on paper, for example, a photoconductor drum.

The CPU 210 controls elements of the printer 200 by executing a variety of programs stored in the memory unit 220. For example, the CPU 210 controls the USB device IF unit 230 so as to receive to-be-printed data from the print server device 100 and controls the printer engine 240 so as to perform printing on the basis of the received to-be-printed data.

The memory unit 220 stores a variety of programs and data, but FIG. 1 selectively shows only elements needed to perform processing of the embodiment. The memory unit 220 stores a control program 222 which allows the CPU 210 to control the printer 200. The memory unit 220 further includes a Management Information Base (MIB) storage portion 224 in which a variety of information associated with the printer 200 is stored in a MIB form. The information stored in the MIB form includes printer setting information, kinds of paper and the number of paper sheets used to print, the amount of toner or ink used to print, and printing destination information which will be described later.

The client 300 is a known personal computer and includes a CPU and a memory unit which are not shown. A web browser 310 is installed in the client 300 and the client 300 can access the print server device 100 using the web browser 310 so as to use a variety of services provided by the print server device 100.

Next, with reference to FIG. 2, provision information stored in the to-be-provided file storage portion 128 will be described. The provision information is specifically a web content and is stored in an XML file form and an XSL file form as shown in FIG. 2. The XML file is a file having XML data described in eXtensible Markup Language (XML). The XSL file is a file containing a style sheet expressing a layout of the XML data described in eXtensible Stylesheet Language (XSL). Hyper Text Markup Language (HTML) data is produced on the basis of the XML data and the XSL data. The XML data is prepared in a manner such that one content is described in a plurality of supportable languages. For example, when the web page which provides the GUI for the printer management service is defined as pageA, as shown in FIG. 2, the number of XML files describing the content of the pageA equals to the number of the supportable languages. In FIG. 2, for example, the XML file is named, for example, "pageA.xml.en-AU." In the file name "pageA.xml.en-AU," "en-AU" is language identification information representing a language in which the content is described.

The language identification information is expressed in a form of "langue code-country code." The language code is a identifier representing kinds of languages and expressed with alphabetical characters. The language code is defined based on ISO639. For example, the language code "en" is a identifier representing English. In the same way, the language codes "zh," "ru," "de," "fr," "es," "ja," and "it" represent Chinese, Russian, German, French, Spanish, Japanese, and Italian, respectively. The country code is a identifier representing a country name with alphabetical characters. The country code is defined based on ISO3166. For example, the country codes "US," "JP," "AU," "CN," "RU," "GB," and "DE" represent United States, Japan, Australia, China, Russia, Great Britain, and German, respectively. The language identification information "en-AU" is a combination of the language code "en" and the country code "AU" and represents English used in Austria. As described above, the language identification information is not configured to include only the language code but configured to use combination of the language code and the country code. By this, it is possible to provide information which satisfies user's demand. For example, in the file described in an "en-US" form, telephone numbers of call centers in United States are provided to a user as access numbers for allowing the user to access service centers but in the file described in an "en-JP" form, telephone numbers of call centers in Japan can be provided to a user as access numbers for allowing the user to access service centers.

Next, with reference to FIG. 3, the language attribute information stored in the language attribute information storage portion 126 will be described. As shown in FIG. 3, the language attribute information storage portion 126 stores a supportable language table, a table of language codes and priority country codes, a table of country codes and default language codes, and a table of country codes and group codes, and a table of group codes and priority languages.

The supportable language table contains language identification information of supportable languages supported by the print server device 100. That is, the supportable language table contains the language identification information of languages (see FIG. 2) in which the XML files stored in the to-be-provided file storage portion 128 are described. According to this embodiment, the printing destination of the print server device 100 is Australia. Further, as shown in FIG. 3, the print server device 100 according to this embodiment supports five languages, "en-AU (English-Australia)," "zh-AU (Chinese-Australia)," "ru-Au (Russian-Australia)," "de-DE (German-Germany)," and "en-GB (English-Great Britain)." The supportable languages are different for each printing destination which is set by the print server device 100. Accordingly, content of the supportable language table is different for each printing destination which is set by the print server device 100. The supportable language identification portion M1 of the server program 122 refers the supportable language table so as to identify supportable languages.

The table of language codes and priority country codes is a table showing country codes of priority countries corresponding to language codes in conjunction with the priority order thereof. As shown in FIG. 3, for example, the language code "ja" representing Japanese is associated with three country codes, "JP" representing Japan which is the first priority, "US" representing United States which is the second priority, and "CN" representing China which is the third priority.

The table of country codes and default languages is a table showing the relationship between default languages and country codes. As shown in FIG. 3, the country code "US" representing United States is associated with the language identification information "en-US" of a default language "English."

The table of country codes and group codes is a table showing group codes corresponding to country codes of principal countries in conjunction with the priority order thereof. The country codes are classified into a plurality of groups according to features of each country. The group codes represent the classified groups, respectively. As shown in FIG. 3, for example, a group code "A" is a code representing the group of countries in which a first foreign language is English. A group code "B" is a code representing the group of countries in which languages belonging to German•Falisci language group are used. For example, as shown in FIG. 3, the country code "US" representing United States is associated with three group codes, a group code "D" (North America) which is the first priority, a group code "E" (South America) which is the second priority, and a group code "C" (Western German language group) which is the third priority.

The table of group codes and priority languages is a table showing the language identification information of priority languages for each group code in conjunction with the priority order thereof. For example, as shown in FIG. 3, the group code "A," which represents the group of countries in which a first foreign language is English, is associated with three pieces of language identification information, "en-US (United States•English)" which is the first priority, "en-GB (Great Britain•English)" which is the second priority, and "en-AU (Australia•English)" which is the third priority.

Here, contents of the table of language codes and priority country codes, the table of country codes and default languages, and the table of country codes and group codes, and the table of country codes and priority languages are in common for all print server devices 100 without having nothing to do with printing destinations of the print server devices 100.

Operation of the Network System

Figure 4:
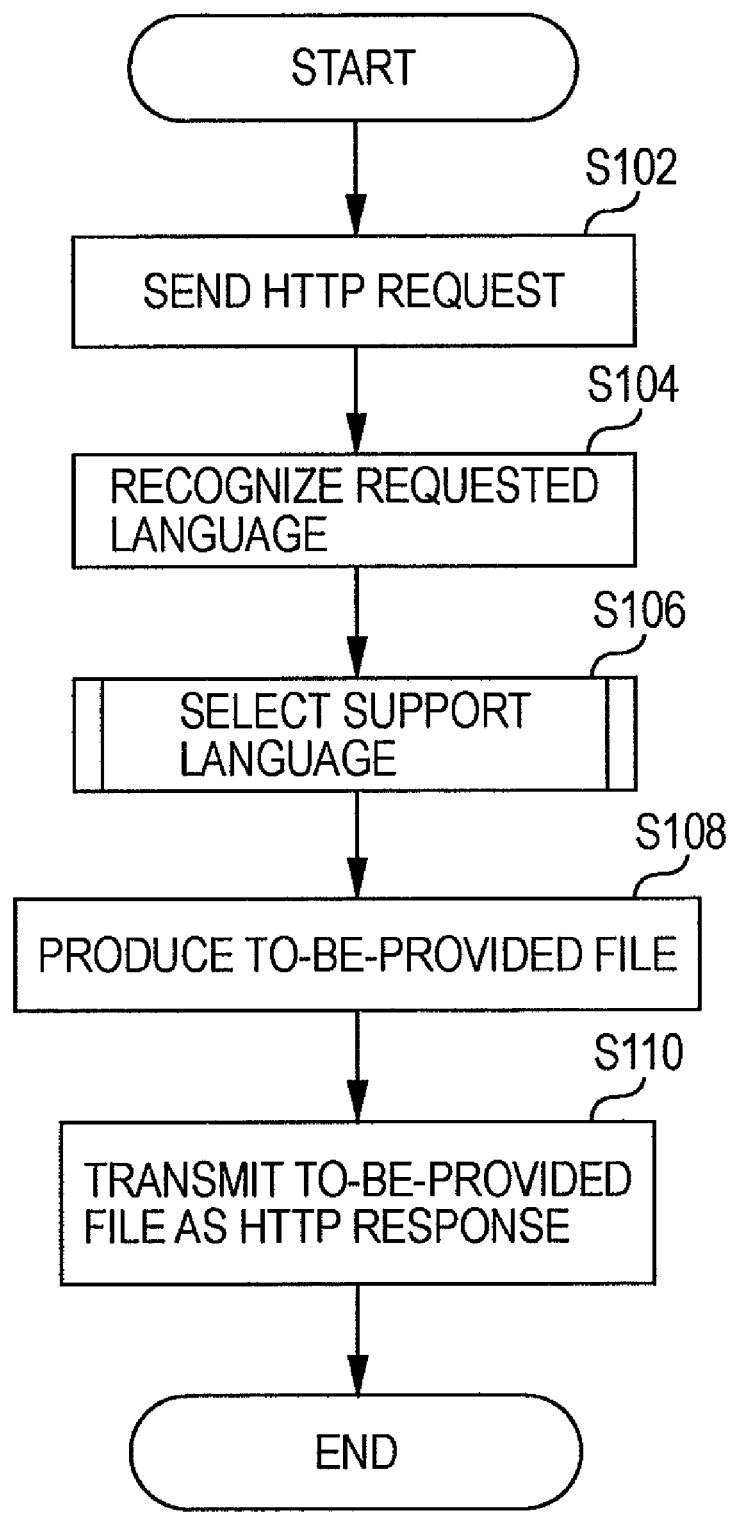
FIG. 4 is a flow chart illustrating the flow of information provision processing.
Figure 5:
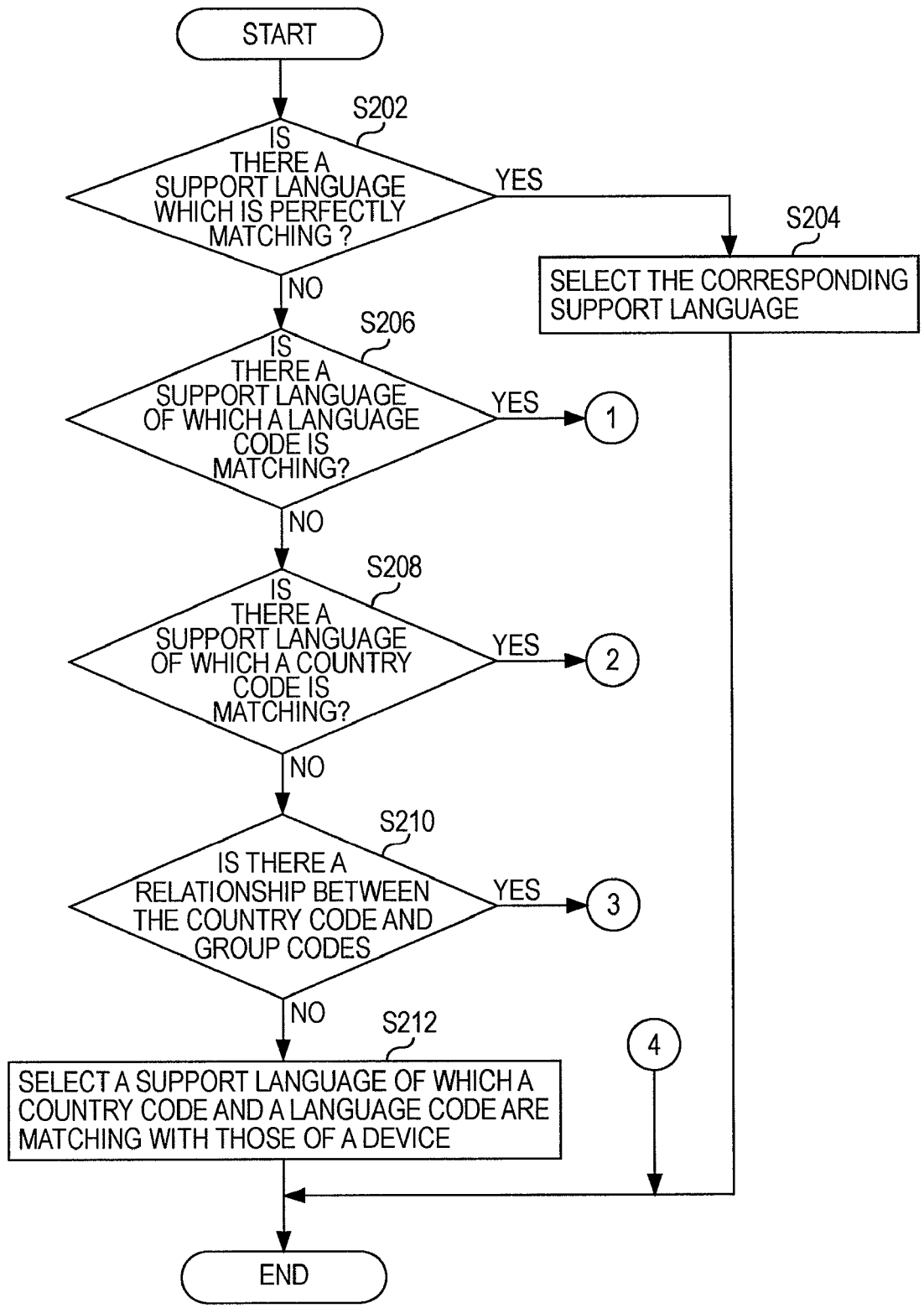
FIG. 5 is a first flow chart illustrating the flow of a support language selection processing routine.
Figure 6:
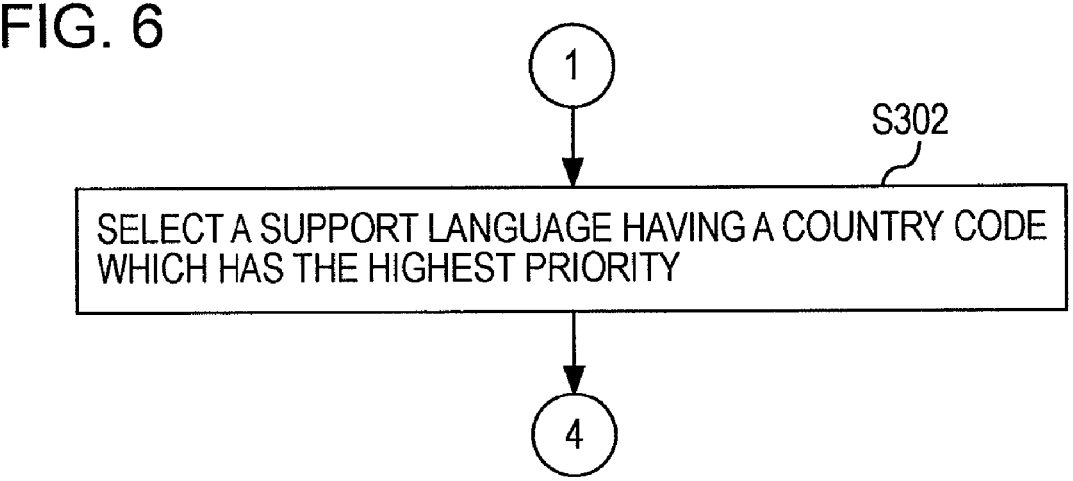
FIG. 6 is a second flow chart illustrating the flow of a support language selection processing routine.
Figure 7:
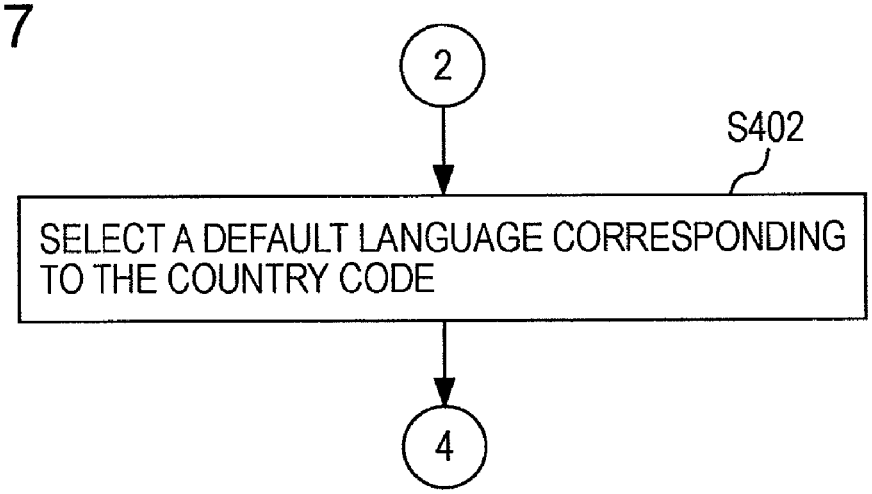
FIG. 7 is a third flow chart illustrating the flow of a support language selection processing routine.
Figure 8:
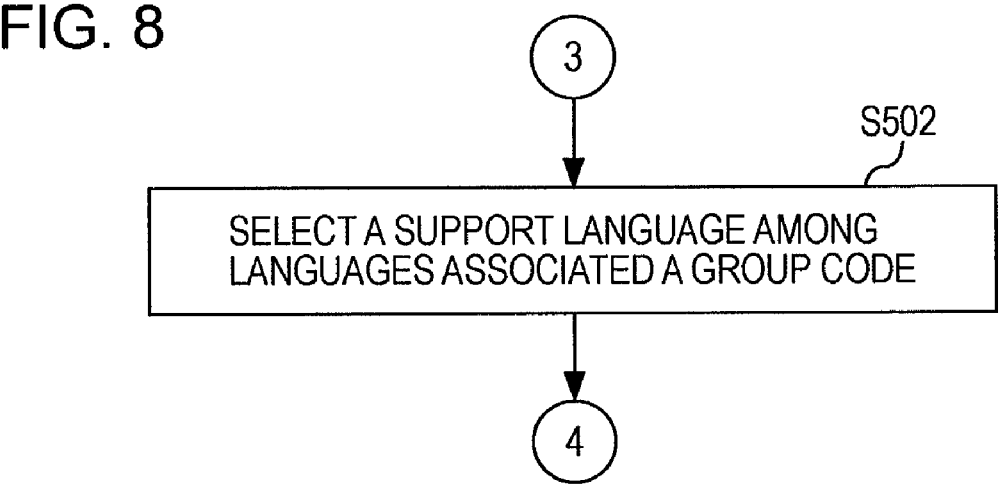
FIG. 8 is a fourth flow chart illustrating the flow of a support language selection processing routine.

Hereinafter, information provision processing of the print server device 100 will be described with reference to FIGS. 4 to 8. In the information provision processing, the print server device 100 receives an information provision request (HTTP request) from the client 300 and sends information requested by the client 300 in response to the information provision request. FIG. 4 is a flow chart showing an information provision processing routine. FIGS. 5 to 8 are flow charts showing support language selection processing routines.

The client 300 sends the HTTP request requesting provision of a web content, i.e. a web page providing GUI which enables the printer management service to the print server device 100 using a web browser 310. For example, the HTTP request includes the following description:

1: GET/webservice/PageA.html HTTP/1.1
2: Host: www.printserver100.jp
3: Accept: text/html, text/plain, image/gif, image/jpeg
4: Accept-Language: en-JP
5: Accept-Encoding: ezip, deflate
6: Accept-Charset: Shift_JIS, utf-8

Row numbers shown in the leftmost ends of rows are provided only on the purpose of helping a reader easily read the description. Accordingly, the row numbers are not substantially included in the HTTP request. The first row in the HTTP request is called a request line and is the most important part of the HTTP request. The first row means that the HTTP request is a request for requesting the print server device to send a file named "/webservice/PageA.html." The second to sixth rows are called a message header and are part containing additional information of the HTTP request. In the message header, a variety of information is described. According to this embodiment, the message header of the HTTP request which is sent to the print server device 100 by the client 300 includes a field of Accept-Language (fourth row). The Accept-Language field designates a requested language in which the client 300 wants to receive data as the response of the request. The field value of the Accept-Language field is the request language represented by the language designation information. In this HTTP request, "en-UP" representing Japan•English is designated as the requested language.

In the print server device 100, the server program 122 receives the HTTP request sent by the client 300 via the network IF unit 140 and the communication protocol program 124 (S102).

After reception of the HTTP request (S102), the server program 122 acquires language identification information provided as the field value of the Accept-Language field and identifies the requested language designated by the client 300 (S104).

The server program 122 performs a support language selection processing (S106). The support language selection processing is to select a language (support language) in which a web content is provided to the client 300 from the supportable languages.

When the support language selection processing starts, the server program 122 checks whether there is the language identification information matching with the language identification information of the requested language in the supportable language table (S202). That is, it is checked whether there is a language perfectly matching with the requested language among the supportable languages. In the case in which there is the supportable language perfectly matching with the requested language (S202: YES), the server program 122 selects such supportable language as the support language (S204).

In the case in which there is no supportable language perfectly matching with the requested language (S202: NO), the server program 122 checks whether there is a language of which a language code in the language identification information matches with the language code in the language identification information of the requested language (S206). That is, it is checked whether there is the supportable language of which the language code matches with the language code of the requested language.

In the case in which the supportable languages of which the language codes are identical to the language code of the requested language are found (S206: YES), the server program 122 selects one supportable language having the highest priority among such supportable languages (S302). In greater detail, the server program 122 acquires country codes having associated with the language code of the requested language in the priority order from the table of language codes and priority country codes. Then, the server program 122 compares combinations of the language code of the requested language and the acquired country codes with all of the language identification information in the supportable language table in turns. The server program 122 selects the supportable language of which the language identification information matches with any of the above-mentioned combinations as the support language.

The above-mentioned language selection processing is explained in greater detail with reference to an example in which the language identification information of the requested language is "en-JP." In this example, there is no supportable language of which language identification information perfectly matches with the language identification information "en-JP" of the requested language. However, there are supportable languages "en-AU" and "en-GB" of which language codes match with the language code "en" of the requested language (S302). In the table of language codes and priority country codes, three country codes "US," "GB," and "AU" are associated with the language code "en" in this priority order (see FIG. 3). In the table, the combination having the highest priority is "en-US." However, there is no such language identification information "en-US" in the table (see FIG. 3). The combination having the second highest priority is "en-GB." This combination is found in the supportable language table (see FIG. 3). As a result, in this example, "en-GB" is selected as the support language.

In the case in which there is no supportable language of which the language code matches with the language code of the requested language (S206: NO), the server program 122 checks whether there is a supportable language of which the country code matches with the language identification information of the requested language in the supportable language table (S208). That is, it is checked whether there is a supportable language of which the country code matches with the country codes of the requested language.

In the case in which the supportable language of which the country code matches with the country code of the requested language is found (S208: YES), the server program 122 selects a default language corresponding to the country code as the support language (S402). In greater detail, the server program 122 acquires the language identification information of the default language associated with the country code of the requested language in the table of country codes and default languages. Then, the server program 122 selects the supportable language of which the language identification information matches with the acquired language identification information as the support language.

The above-mentioned language selection processing is explained in greater detail with reference to an example in which the language identification information of the requested language is "tr-AU." According to this example, it is assumed that there is no supportable language of which language identification information perfectly matches with the language identification information "tr-AU" of the requested language and there is no supportable language of which a language code matches with a language code "tr" of the requested language. However, there are supportable languages ("en-AU," "zh-AU," and "ru-AU") of which country codes match with the country code "AU" of the requested language (S402). The country code "AU" is associated with the language identification information "en-AU" of the default language in the table of country codes and default languages (see FIG. 3). As a result, in this concrete example, "en-AU" is selected as the support language.

In the case in which there is no supportable language of which the country code matches with the country code of the requested language (S208: NO), the server program 122 checks whether the country code of the requested language is associated with the group code using the table of country codes and group codes (S210).

In the case in which it is determined that the country code of the requested language is associated with the group code (S210: YES), the server program 122 selects one supportable language associated the requested language by the group code among the supportable languages (S502). At this time, in the case in which the country code of the requested language is associated with a plurality of group codes, the server program 122 selects the supportable language associated with the group code having the highest priority as the support language. On the other hand, in the case in which there is a plurality of supportable languages associated with the group code, the server program 122 selects the supportable language having the high priority among such associated supportable languages as the support language.

In greater detail, the server program 122 acquires the group codes associated with the country code of the requested language from the table of country codes and group codes in the priority order. Then, the server program 122 compares the language identification information associated with the acquired group code in the group codes and priority languages with the language identification information described in the supportable language table in turns in the priority order. If there is the language identification information matching with each other, the server program 122 selects the supportable language having the matched language identification information.

The above-mentioned language selection processing will be explained in greater detail with reference to an example in which the language identification information of the requested language is "tr-JP." In the example, there is neither supportable language of which the language identification information perfectly matches with the language identification information "tr-JP" of the requested language nor supportable language of which the language code matches with the language code "tr" of the requested language. Further, there is no supportable language of which the country code matches with the country code "JP" of the requested language. On the other hand, the country code "JP" of the requested language is registered in the table of country codes and group codes. Accordingly, it is possible to establish relation between the country code "JP" of the requested language and group codes (see FIG. 3) (S502). In the table of country codes and group codes, the country code "JP" is associated with the group code "A" representing the group of countries in which the first foreign language is English and the group code "F" representing the group of countries in Asia (see FIG. 3). From the table of group codes and priority language codes, it is possible to establish relation between the group code "A" having the highest priority and three pieces of language identification information "en-US," "en-GB," and "en-AU." Among the three pieces of language identification information associated with the group code "A," the highest priority is "en-US." However, the language identification information "en-US" does not exist in the supportable languages (see FIG. 3). The next highest priority is "en-GB" and the langue discrimination information "en-GB" exists in the supportable languages (see FIG. 3). As a result, in this concrete example, "en-GB" is selected as the support language.

In the case in which it cannot establish relation between the country code of the requested language and the group codes (S210: NO), according to this embodiment, the server program 122 selects the supportable language of which the country code and the language code match with the country code and the language code set in the printer 200 as the support language (S212). The MIB storage portion 224 of the printer 200 stores the country code and the language code corresponding to the printing destination of the printer 200 as the MIB data therein. The server program 122 performs communication with the printer 200 and acquires the country code and the language code stored in the MIB storage portion 224 of the printer 200. Then, the server program 122 selects the supportable language of which the language identification information matches with the combination of the acquired language code and the country code as the support language.

The server program 122 stops the support language selection processing after selection of the support language.

With reference to FIG. 4, explanation of the present embodiment continues. The server program 122 produces a to-be-provided file described in the selected support language after stopping the support language selection processing (S108). In greater detail, the server program 122 selects one file described in the selected support language from the XML file group corresponding to the URI designated in the first row of the HTTP request and including XML files described in all supportable languages as shown in FIG. 2. Then, the server program 122 produces an HTML file serving as the to-be-provided file on the basis of the selected XML file and an XSL file corresponding to the XML file.

After production of the to-be-provided file, the server program 122 sends the produced to-be-provided file to the client 300 as a HTTP response (S110), thereby completing information provision processing.

According to the print server device 100 of the present embodiment, even in the case in which there is no supportable language matching with the requested language desired by the client 300, it is possible to select the most desirable language for a user of the client 300 among the supportable languages using the language identification information stored in the language attribute information storage portion 126. As a result, the print server device 100 can provide information to the client 300 in a language with high probability that a user of the client 300 can understand.

In greater detail, in the case in which there are many supportable languages of which language codes match with the language code of the requested language, the supportable language of which the country code has the highest priority is selected as the support language using the table of language codes and priority country codes. For example, by determining the priority according to populations of languages used in the country represented by the country code, it is possible to provide information in a language having high probability that a user of the client 300 can understand.

Further, in the case in which there are many supportable languages of which country codes match with the country code of the requested language, since the supportable language is selected in relation with the country code of the corresponding country by using the table of country codes and default languages, it is possible to provide a language having high probability that a user of the client 300 can understand by establishing relation between languages and the country code of the corresponding country in the order of populations using the languages in the country represented by the corresponding country code.

Even in the case in which there is no supportable language of which both the country code and language code match with the country code and language code of the requested language, since the language highly associated with the requested language is selected as the support language using the table of country codes and group codes and the table of group codes and priority languages, it is possible to select the language having high probability that a user of the client 300 can understand as the support language.

B: Modifications

First Modification

In the table of country codes and default languages used in the above-mentioned embodiment, one country code is associated with only one default language. This is because a print server device 100 of which printing destination is anywhere must support the default language in the case in which the printer supports a plurality of languages of which the country codes are the same. If the print server device 100 is not configured in such way, like other tables, it may be possible to establish relation between each country code and a plurality of languages with the priority order in the country codes and default languages.

Second Modification

In the above-mentioned embodiment, the attribute information (tables shown in FIG. 3) associated with the language identification information and the support language selection algorithm (shown in FIGS. 5 to 8) are just as examples. That is, other algorithms may be used. For example, according to the above-mentioned embodiment, in the case in which there are many supportable languages of which country codes match with the country code of the requested language, the supportable language of which the country code has a higher priority is selected using the table of language codes and priority country codes. However, instead of the above-mentioned algorithm, the following algorithm may be used.

For example, the print server device 100 supports four languages of which the language identification information is "en-US (United States)," "en-JP (Japan)," "en-GB (Great Britain)," and "en-SA (Saudi Arabia)" each including a language code "en," Further, by the language attribute information, a group code "America" is associated with country codes of countries in North, Central, and South America, such as US, CA (Canada), AR (Argentina), MX (Mexico), and so on. In the same way, a group code "Asia" is associated with country codes of countries in Asia, such as JP, CN (China), TW (Taiwan), KR (South Korea), and so on. A group code "Europe" is associated with country codes of countries in Europe, such as GB, ES (Spain), FR (France), IT (Italia), and so on. A group code "Middle West" is associated with country codes of countries in Middle East, such as SA, YE (Yemen), IQ (Iraq), EG (Egypt), and so on. In the case in which the country code of the requested language is "en," the print server device 100 selects the supportable language having the country code belonging to the group to which the country code of the requested language belongs as the support language. In greater detail, in the case in which the requested language is "en-CA," the supportable language "en-US" having the country code "US" in the group to which the country code "CA" belongs is selected as the support language. On the other hand, in the case in which the requested language is "en-ES," the supportable language "en-GB" having the country code "GB" in the group to which the country code "ES" belongs is selected as the support language.

Third Modification

According to the above-mentioned embodiment, the print server device 100 provides the client 300 with services using HTTP protocol but the invention is not limited thereto. For example, the print server device 100 may provide the client 300 with services using a specific protocol prepared by a printer maker. In such case, a specific client program, for example, a network printer management program is installed in the client 300 instead of the web browser and the specific client program allows the client 300 to access the print server device 100. In such case, it is preferable that the specific client program can produce a request to be sent to the print server device 100 in which the request includes requested language specification information which specifies a requested language like the Accept-Language field in the HTTP request.

Fourth Modification

In the above-mentioned embodiment, the print server device 100 is exemplified as the server device but the invention is not limited to the print server device 100 and may be applied to any server device as long as it can provide information in a plurality of languages. In greater detail, the invention can be applied to a general web server or a FTP server.

Fifth Modification

In the above-mentioned embodiment, the print server device 100 provides information in a plurality of languages by storing XML files described in a plurality of supportable languages in the to-be-provided file storage portion 128. However, the method of providing information in a plurality of languages is not limited thereto. For example, the print server device 100 may have an XML file described in one support language stored in the to-be-provided file storage portion 128 and have a translation program which translates the XML file into other support languages. In such case, the print server device 100 produces XML data described in a support language by translating the content of XML file stored in the to-be-provided file storage portion 128 into the support language using the translation program corresponding to the selected support language.

Sixth Modification

In the above-mentioned embodiment, the print server device 100 connected to the printer 200 is exemplified as a server device, but the server device of the invention may be connected to other kinds of devices. For example, the server device of the invention may be a server device connected to a multifunction printer having a scanner function, a facsimile function, a copier function, and a printer function. In more general, the server device may be a device connected to any kinds of device. The invention may be applied to any devices operating under the condition in which communications with other devices must be limited to a predetermined number.

Sixth Embodiment

Part of the structure of the invention which is implemented by hardware according to the above-mentioned embodiment may be embodied by software. Conversely, part of the structure of the invention which is implemented by software according to the above-mentioned embodiment may be embodied by hardware.

The invention is explained based on the above embodiments and modifications thereof but the invention is not limited to the above embodiments and modifications because such embodiments and modifications are provided only for the illustration purpose. The invention can be altered and further modified without departing from the spirit of the invention or the scope of claims and the invention includes equivalents thereof.

What is claimed is:

1. A server device which can provide a client device with information in a plurality of languages, the device comprising:
   a central processing unit (CPU), and
   a memory, the memory including
   a supportable language recognizing unit recognizing a plurality of supportable languages using language identification information;
   a requested language recognizing unit recognizing a requested language desired by the client device using the language identification information;
   an attribute information acquiring unit acquiring attribute information associated with the language identification information; and
   a language selecting unit selecting one supportable language from the plurality of supportable languages as a support language in which information is provided to the client device, using the attribute information when the language identification information of the requested language does not match with that of any of the plurality of supportable languages;
   wherein the language identification information includes at least a first identifier, the attribute information includes priority information for determining a priority order of the supportable languages of which the first identifiers are the same as each other, and the language selecting unit selects the support language from the plurality of supportable languages of which the first identifiers match with that of the requested language on the basis of the priority order when there is no supportable language of which the language identification information matches with the language identification information of the requested language but there is the supportable languages of which the first identifiers match with that of the requested language;
   wherein the language identification information is preliminarily classified into a plurality of groups, the attribute information includes first group information for specifying a group to which the requested language belongs, and the language selecting unit selects the support language from the supportable languages depending on the group to which the requested language belongs.

2. The server device according to claim 1, wherein the first identifier is a language code.

3. The server device according to claim 2, wherein the language identification information includes the language code and a country code, and the priority order is determined depending on the country codes.

4. The server device according to claim 1, wherein the language identification information includes at least a second identifier, the attribute information includes default information for specifying a default language for each second identifier, and the language selecting unit selects the support language from the supportable languages of which the second identifiers match with the second identifier of the requested language on the basis of the default information when there is no supportable language of which the language identification information matches with that of the requested language but there is the supportable languages of which the second identifiers match with the second identifier of the requested language.

5. The server device according to claim 4, wherein the second identifier is a country code.

6. The server device according to claim 1, wherein the attribute information includes second group information for specifying the supportable languages in the group to which the requested language belongs, and the language selecting unit selects the supportable language in the group to which the requested language belongs as the support language.

7. The server device according to claim 1, wherein the language identification information includes at least a second identifier and the first group information is associated depending on the second identifiers.

8. The server device according to claim 7, wherein the second identifier is a country code.

9. The server device according to claim 1, the requested language recognizing unit recognizes the requested language by acquiring the language identification information included in an information request sent from the client device.

10. The server device according to claim 1, further comprising an attribute information storage unit in which the attribute information preliminarily determined is stored in association with the language identification information, wherein the attribute information acquiring unit acquires the attribute information from the attribute information storage unit.

11. A method used in a server device which can provide a client device with information in a plurality of languages, the method comprising:

recognizing a plurality of supportable languages using language identification information using a central processing unit (CPU);

recognizing a requested language desired by the client device using the language identification information using the CPU;

acquiring attribute information associated with the language identification information using the CPU; and selecting one supportable language from the supportable languages as a support language in which information is provided to the client device using the CPU, by using the attribute information when the language identification information of the requested language does not match with the language identification information of any of the plurality of supportable languages;

wherein the language identification information includes at least a first identifier, the attribute information includes priority information for determining a priority order of the supportable languages of which the first identifiers are the same as each other, and the language selecting unit selects the support language from the plurality of supportable languages of which the first identifiers match with that of the requested language on the basis of the priority order when there is no supportable language of which the language identification information matches with the language identification information of the requested language but there is the supportable languages of which the first identifiers match with that of the requested language;

wherein the language identification information is preliminarily classified into a plurality of groups, the attribute information includes first group information for specifying a group to which the requested language belongs, and the support language is selected from the supportable languages depending on the group to which the requested language belongs.

12. A non-transitory computer readable recording medium including a computer program which enables a computer to perform a server function of providing a client device with information in a plurality of languages, the server function comprising:

a first function of recognizing a plurality of supportable languages using language identification information;

a second function of recognizing a requested language desired by the client device using the language identification information;

a third function of acquiring attribute information associated with the language identification information; and a fourth function of selecting one supportable language from the plurality of supportable languages as a support language in which information is provided to the client device, using the attribute information when the language identification information of the requested language does not match with the language identification information of any of the plurality of supportable languages;

wherein the language identification information includes at least a first identifier, the attribute information includes priority information for determining a priority order of the supportable languages of which the first identifiers are the same as each other, and the language selecting unit selects the support language from the plurality of supportable languages of which the first identifiers match with that of the requested language on the basis of the priority order when there is no supportable language of which the language identification information matches with the language identification information of the requested language but there is the supportable languages of which the first identifiers match with that of the requested language;

wherein the language identification information is preliminarily classified into a plurality of groups, the attribute information includes first group information for specifying a group to which the requested language belongs, and the support language is selected from the supportable languages depending on the group to which the requested language belongs.

* * * * *